US006246033B1

United States Patent
Shah

(10) Patent No.: US 6,246,033 B1
(45) Date of Patent: Jun. 12, 2001

(54) METHOD AND APPARATUS OF CONTROLLING OPERATION OF RANGE TOP HEATING ELEMENTS FOR COOKING

(76) Inventor: Reza H. Shah, 21 Park Avenue, Acton, Ontario (CA), L7J 1Y3

( * ) Notice: Subject to any disclaimer, the term of this patent is extended or adjusted under 35 U.S.C. 154(b) by 0 days.

(21) Appl. No.: 09/455,925

(22) Filed: Dec. 7, 1999

(51) Int. Cl.$^7$ ........................................ H05B 3/68
(52) U.S. Cl. ........................................ 219/447.1
(58) Field of Search .................. 219/446.1, 447.1, 219/448.11, 448.12, 448.13, 493, 494, 509, 510

(56) References Cited

U.S. PATENT DOCUMENTS

| | | | |
|---|---|---|---|
| 3,384,735 | * 5/1968 | Linger | 219/448.11 |
| 3,586,824 | * 6/1971 | Barney | 219/447.1 |
| 3,777,187 | * 12/1973 | Kohn | 219/494 |
| 4,680,452 | * 7/1987 | Fischer et al. | 219/448.11 |
| 4,886,955 | * 12/1989 | Kimura | 219/494 |
| 5,257,863 | * 11/1993 | Chu et al. | 374/153 |
| 5,448,220 | * 9/1995 | Levy | 340/539 |
| 5,620,255 | * 4/1997 | Cook, III | 374/141 |

* cited by examiner

Primary Examiner—Sang Paik
(74) Attorney, Agent, or Firm—David W. Wong

(57) ABSTRACT

A method and device for controlling and limiting the cooking temperature of any selected utensil for cooking on a surface burner element of a range are shown. A temperature sensor is provided either on a heat transfer plate which is mounted to the burner element or in a remote-controlled unit mounted directly to the utensil. The actual temperature of the utensil is compared with the selected cooking temperature, and it is then adjusted to maintain the two temperatures close to each other. The device also automatically turns off the burner element in a potential runaway condition or in the absence of a utensil placed thereon.

9 Claims, 7 Drawing Sheets

METHOD AND APPARATUS OF CONTROLLING OPERATION OF RANGE TOP HEATING ELEMENTS FOR COOKING

BACKGROUND OF THE INVENTION

This invention relates to the method and the device for controlling the temperature of all utensils for cooking on a burner element particularly on the surface burner element of a range. There are many types of ranges equipped with surface burner elements presently in use. Some surface burner elements of electric ranges are in the form of spiral sheathed heating elements, while others have a flat heat transfer top made of either glass, metal alloy, or ceramic with the heating elements located underneath such top. Others use natural gas for heating. The challenge is to create a regulating device which can provide safe control of the cooking temperature of the utensil placed on the heating element. Most electric ranges in use nowadays do not have any cooking temperature control per se; a device commonly referred to as a heat switch is used to regulate the current to the burner element so as to vary its heating power. The heat switch may be in the form of a mechanical switch provided with a current coil or a current control electronic circuit which operates to vary the heating power of the burner element. Malfunction of such current control would inevitably result in a run away operation of the burner element, namely the burner element would operate continuously with increasing power to result ultimately in a fire hazard. In cooking, it is, in fact, the temperature of the utensil that actually cooks the food contained within it. However, by controlling the heating power output of the burner element, the actual cooking temperature is unknown. Since utensils of various sizes and volumes may be used for cooking and also various types and volumes of food are being cooked, it is necessary to re-adjust the heat switch when using utensils of different sizes and volumes for cooking various types and amount of food. The user has to estimate the appropriate setting of the heating power of a burner element, depending on the size of the utensil, and the amount of food to be cooked in the utensil. The heat switch varies the current to the burner element with a series of ON and OFF cycles so as, in turn, to vary its heating power. Such method of merely varying the heating power does not provide a satisfactory cooking operation when using utensils of different shapes and sizes for cooking foods having various masses of liquids and/or solids so that the heat losses, as well as the thermal capacities may vary widely; therefore, the same amount of heat applied to two very different utensils will result in two very different actual cooking temperatures. Furthermore, the heat required to raise the temperature of the utensil is often much higher than the heat required to maintain the utensil at a desired cooking temperature. Most users would turn the heat switch control dial to the maximum heat setting in order to save time in heating the utensil to the desired cooking temperature quickly; and it is intended to turn the control dial down to a lower maintenance heat setting after the utensil has attained the desired temperature. However, often time, the user forgets to do so, resulting in dire consequences in which the cooking pot may become overheated, or even melted, or the cooking oil or similar flammable substance inside the pot may be ignited. Kitchens and whole houses have been known to burn down in many cases due to such negligence.

In U.S. Pat. No. 4,492,336 to Takata et al and U.S. Pat. No. 4,470,888 to Ceste et al, temperature controls for particular types of cooking vessels are shown. Such temperature controls do not cater to universal applications for cooking with different types of cooking utensils such as boiling water in a kettle, or heating a large stew pot; and they cannot be used for controlling common cooking utensils intended for use in cooking with different types of conventional surface burner elements.

There have been attempts to sense directly the temperature of the utensil during cooking by means of infrared devices, such as those shown in U.S. Pat. 4,734,553 to Noda and U.S. Pat. No. 4,499,357 to Kojima. However, these methods and devices suffer the critical drawback that the infrared waves can be blocked by the lid, handle, or other parts of the utensil to render them inoperative. Thus, there is a great demand that the temperature sensing method and device must be capable of sensing directly the actual cooking temperature of any cooking utensil which is heated on all types of conventional burner elements so that the application of the method and device is universal. Furthermore, the method and device must be capable of turning off the burner element when there is no cooking utensil placed thereon or to prevent the burner element from operating in a runaway condition.

SUMMARY OF THE INVENTION

It is the principal object of the present invention to provide a method and device for controlling the actual cooking temperature of any utensil to be heated on a common burner element of a cooking heater.

It is another object of the present invention to provide a heat control device having an integral fail safe circuits which is operative to turn off the burner element in case of some critical components failure in the device due to unforeseeable circumstances.

It is another object of the present invention to provide a reliable temperature control device which may be incorporated into existing cooking heaters with simple modification to the latter.

It is another object of the present invention to provide a heat control device which has a protective cover for the heating elements of the cooking heaters so as to alleviate the likelihood of any fire hazard.

It is yet another object of the present invention to provide a method and device which is capable of sensing the presence or absence of a utensil placed on the cooking heater and to switch off the heating elements automatically when the utensil is absent.

Briefly, the device according to the present invention includes a temperature sensing means mounted in close contact with the cooking utensil such as on a heat transfer plate mounted to the burner element on which the utensil is located. A switching means is connected in series with the temperature sensing means. The switching means has switching elements connected in series to the current control switch and the surface burner element. The switching means has actuation element therein connected to the temperature sensing means. The actuation means is operative in response to the actual temperature of the cooking utensil sensed by the temperature sensing means for selectively operating the switching elements for energizing the burner element.

The device may have a battery powered transmitter mounted directly on the utensil and the switching means is located in a receiver means. The actual cooking temperature of the utensil is sensed by a thermocouple having a heat sensing junction which is either in direct contact with the side wall of the utensil or mounted to the heat transfer plate. The thermocouple will generate a voltage signal relative to the actual cooking temperature of the utensil. A temperature selector in provided in the transmitter for selecting the desired cooking temperature. The transmitter operates to compare the actual cooking temperature and the selected temperature to transmit a control signal to the receiver for actuating the switching means for turning the burner element in a series of on and off cycles so that the actual cooking temperature is equal to the desired cooking temperature.

DETAILED DESCRIPTION OF THE PREFERRED EMBODIMENTS

Figure 1:
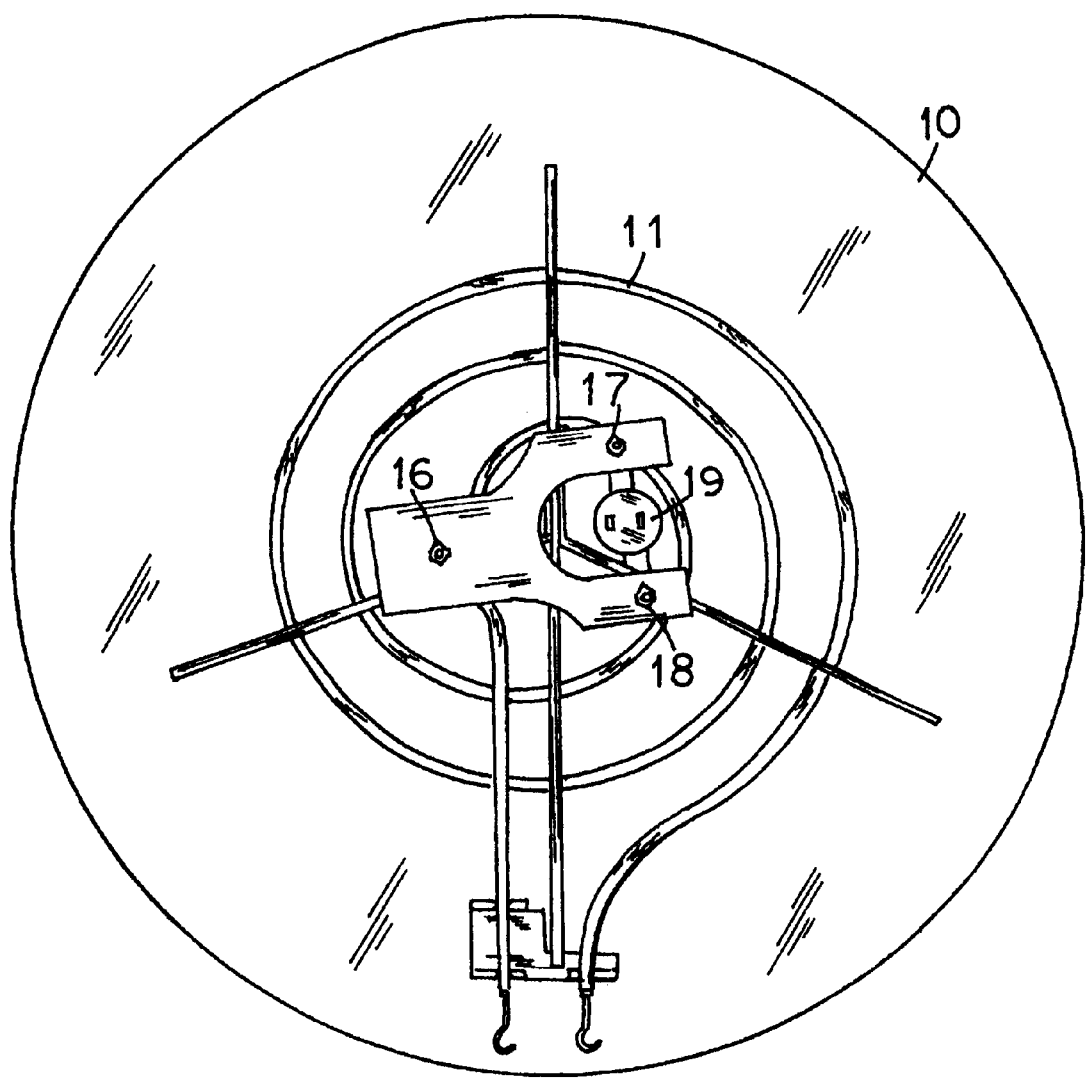
FIG. 1 is a bottom elevation of the burner element of a cooking heater having the component of the heat control according to the present invention mounted thereon.
Figure 2:
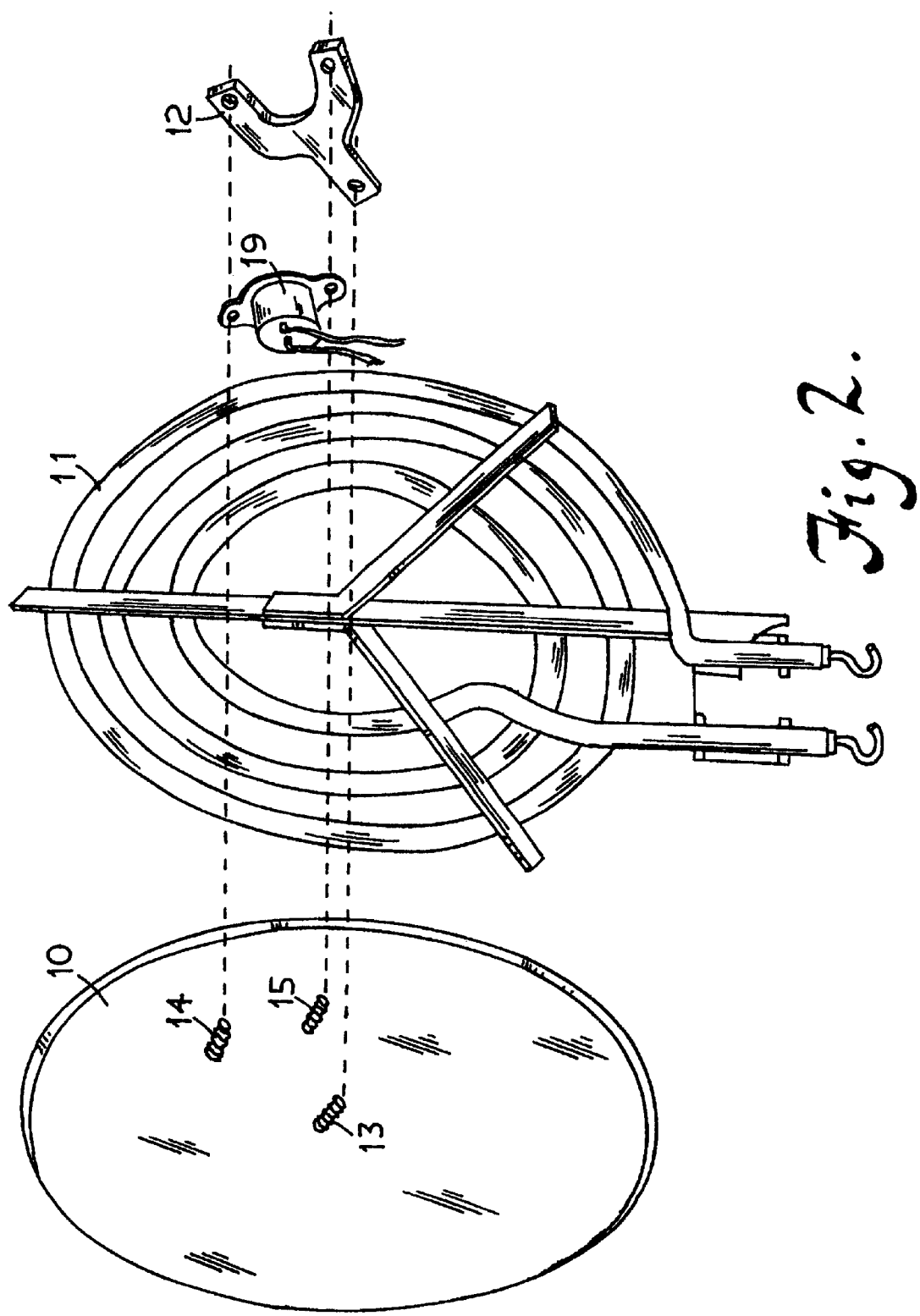
FIG. 2 is an exploded elevation view of FIG. 1 showing the various components therein.

The invention will now be described with reference to the accompanying drawings wherein corresponding parts are identified with the same reference numerals and/or alpha-numerals. The heat sensing assembly of the present device for mounting to a conventional burner element is best shown in FIGS. 1 and 2. Only one heat sensing assembly is shown for the simplicity of illustration purposes. It can be appreciated that the assembly is similar for all surface burner elements in an electric range in which, commonly, four surface burner elements are provided. The heat sensing assembly of the present invention includes a heat transfer plate 10 mounted to the burner element 11 such as a spiral sheath-type surface burner element. A removable burner element is shown as an example. The assembly may similarly be applied to tiltable burner elements which are permanently mounted to the range top but they may be tilted upwards to facilitate cleaning of any food spillage to a burner box area located below the burner elements. The heat transfer plate 10 has a diameter larger than the opening in the range top surrounding the burner element such that any spillage due to boil over during cooking will be diverted by the heat transfer plate 10 to the range top rather than running into the burner box so as to facilitate easy cleaning up in the event of such spillage. The heat transfer plate 10 may be molded of aluminum or other metal or alloy having a high thermal conductivity and its surface may be anodized to resist abrasion. The heat transfer plate 10 is mounted to the burner element 11 by a Y-shaped mounting plate 12 which is secured to the heat transfer plate 10 by three bolts 13, 14 and 15 affixed to the under side of the heat transfer plate 10 together with associated nuts 16, 17 and 18 respectively.

A thermostat 19 is also mounted to the heat transfer plate 10 by the bolts 14 and 15 with separate nuts so that it abuts tightly against the surface of the heat transfer plate 10 for sensing its surface temperature. Alternatively, a thermocouple may be mounted to either one of the bolts 14 and 15 by welding to a washer which is secured to the bolt by a nut so that it is held tightly against the heat transfer plate 10 for sensing its surface temperature. The opening in the bifurcation of the mounting plate 12 permits ready access to the electrical connection terminals of the thermostat 19.

Figure 3:
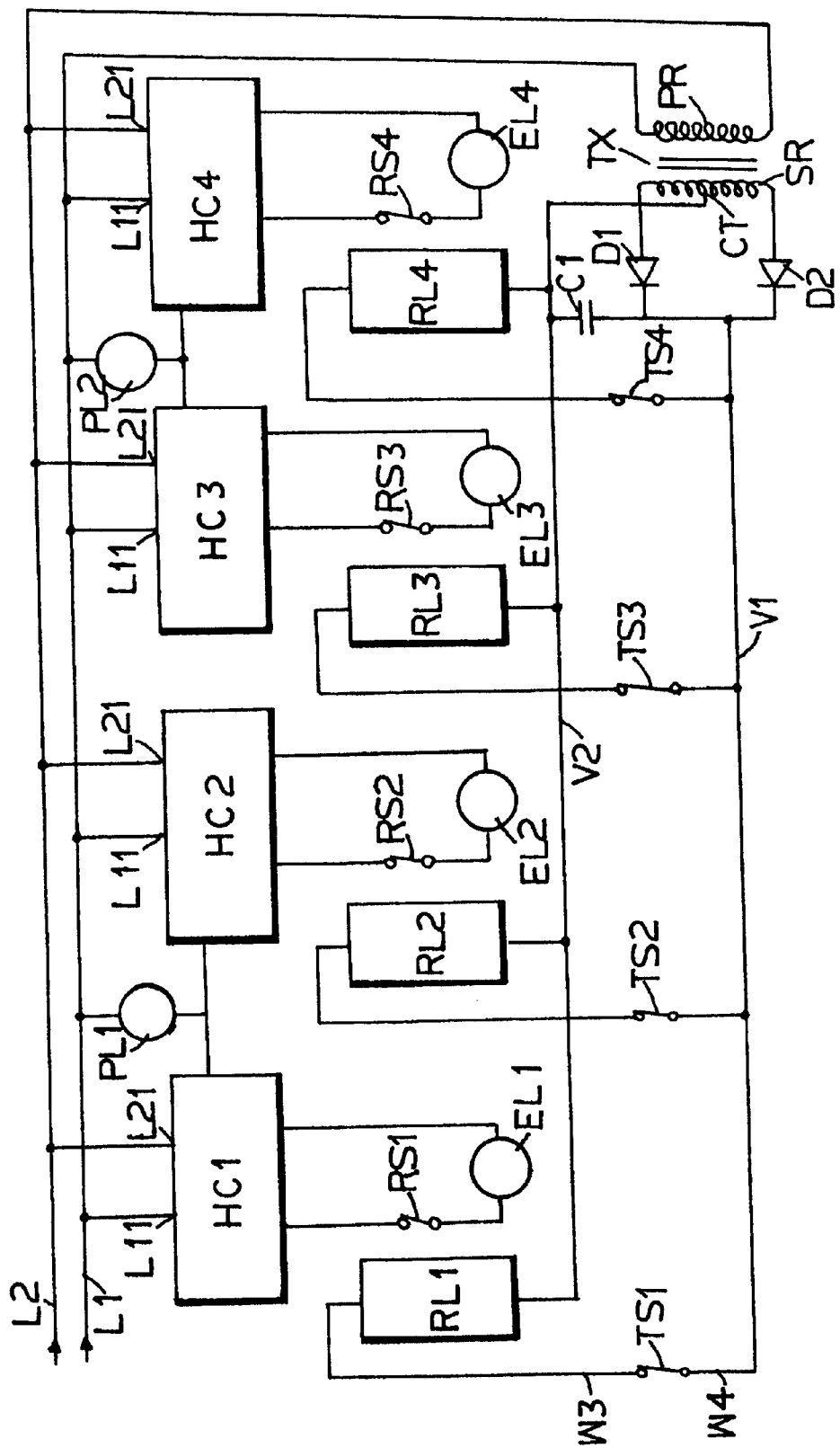
FIG. 3 is a schematic circuit diagram of the electrical control circuit of the device according to the present invention.

The electrical circuit for use with the heat sensor of the device for controlling the temperature of all four burner elements is shown in FIG. 3. The supply of power from the power lines L1 and L2 to the four burner elements EL1, EL2, EL3 and EL4 are controlled by four heat switches HC1, HC2, HC3, and HC4 respectively in a conventional electric ranges, which, in fact, only control the current flowing through the burner elements. The actuation of the burner elements are indicated by pilot lights PL1 and PL2. According to the present invention, four relays RL1, RL2, RL3 and RL4 are incorporated to control the operation of the burner elements EL1, EL2, EL3 and EL4 respectively. The terminals of the switching contacts RS1, RS2, RS3 and RS4 of the relays RL1, RL2, RL3 and RL4 respectively are connected in series with the burner elements EL1, EL2, EL3 and EL4. The direct current operating power for the relays EL1, EL2, EL3 and EL4 is supplied from the power lines L1 and L2 by a rectification circuit consisting of a stepdown transformer TX, rectifier diodes D1 and D2, and modulating capacitor C1. Temperature control thermostats TS1, TS2, TS2 and TS4 are connected in series with the operating coils of the relays. The thermostats TS1, TS2, TS3 and TS4 correspond to the thermostat 12 mounted to the heat transfer plate 10 of each of the burner elements EL1, EL2, EL3 and EL4 respectively as shown in FIGS. 1 and 2. Since the cooking utensil is placed on the heat transfer plate 10, its mass becomes integral with the cooking utensil such that its temperature of the heat transfer plate 10 is equal to the actual cooking temperature of the utensil. As long as the thermostats are closed, the relays are energized and power can be applied to the burner elements. The thermostats are preset so that their contacts will be opened at a safe temperature which is below the ignition temperature of oil, paper or such similar substances commonly present in the kitchen thereby reducing the risk of fire.

In the beginning of the cooking operation, the thermostat is closed. When the temperature of the heat transfer plate 10 is increased to higher than the preset opening temperature of the thermostat, the thermostat contacts become opened thereby deactivating the relay and, in turn, turning off the associated burner element so that the heat transfer plate as well as the utensil will cool down in a short period of time.

Figure 4:
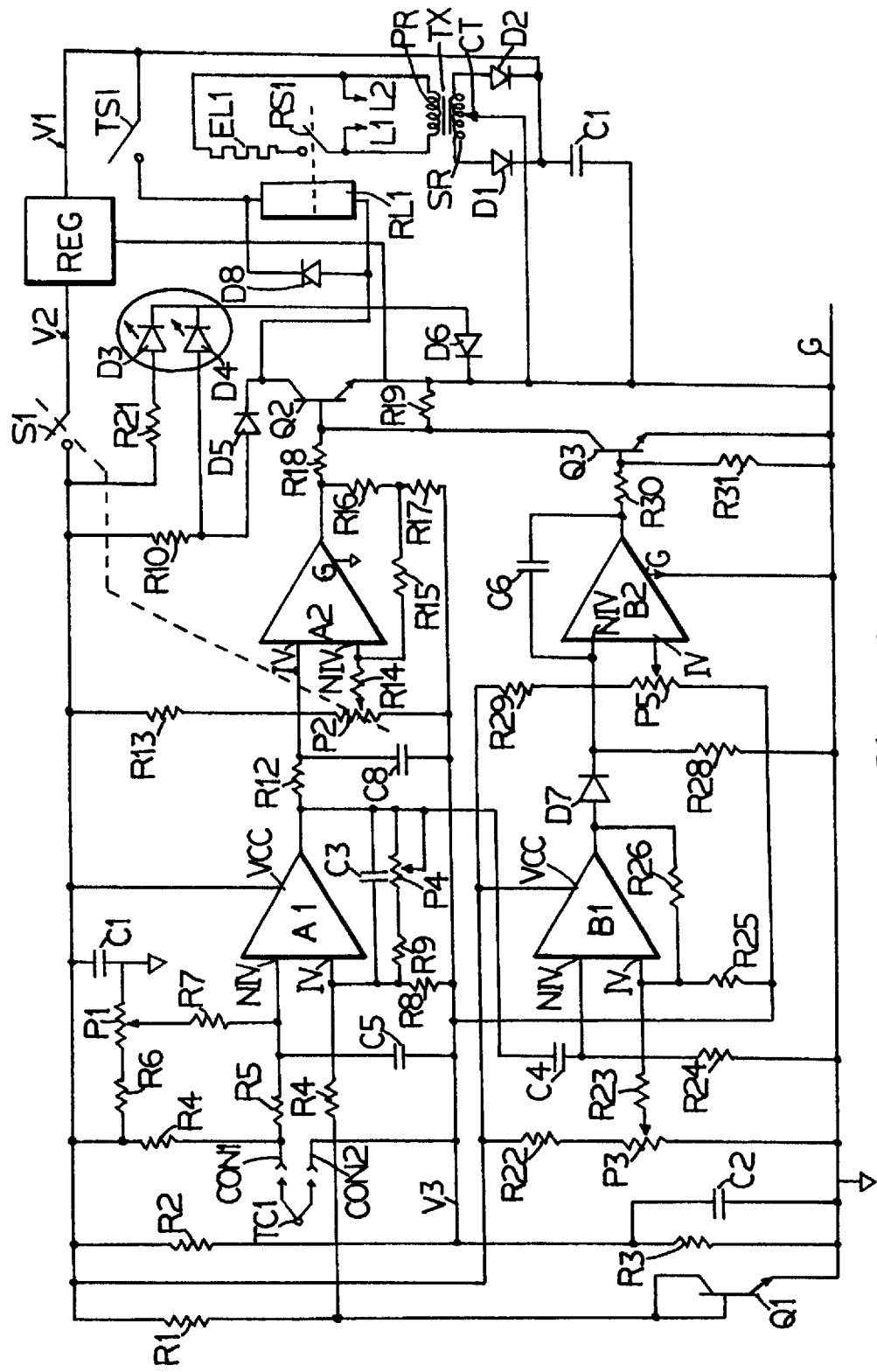
FIG. 4 is a schematic diagram of a preferred embodiment of the heat control electrical circuit in the device according to present invention.
Figure 5:
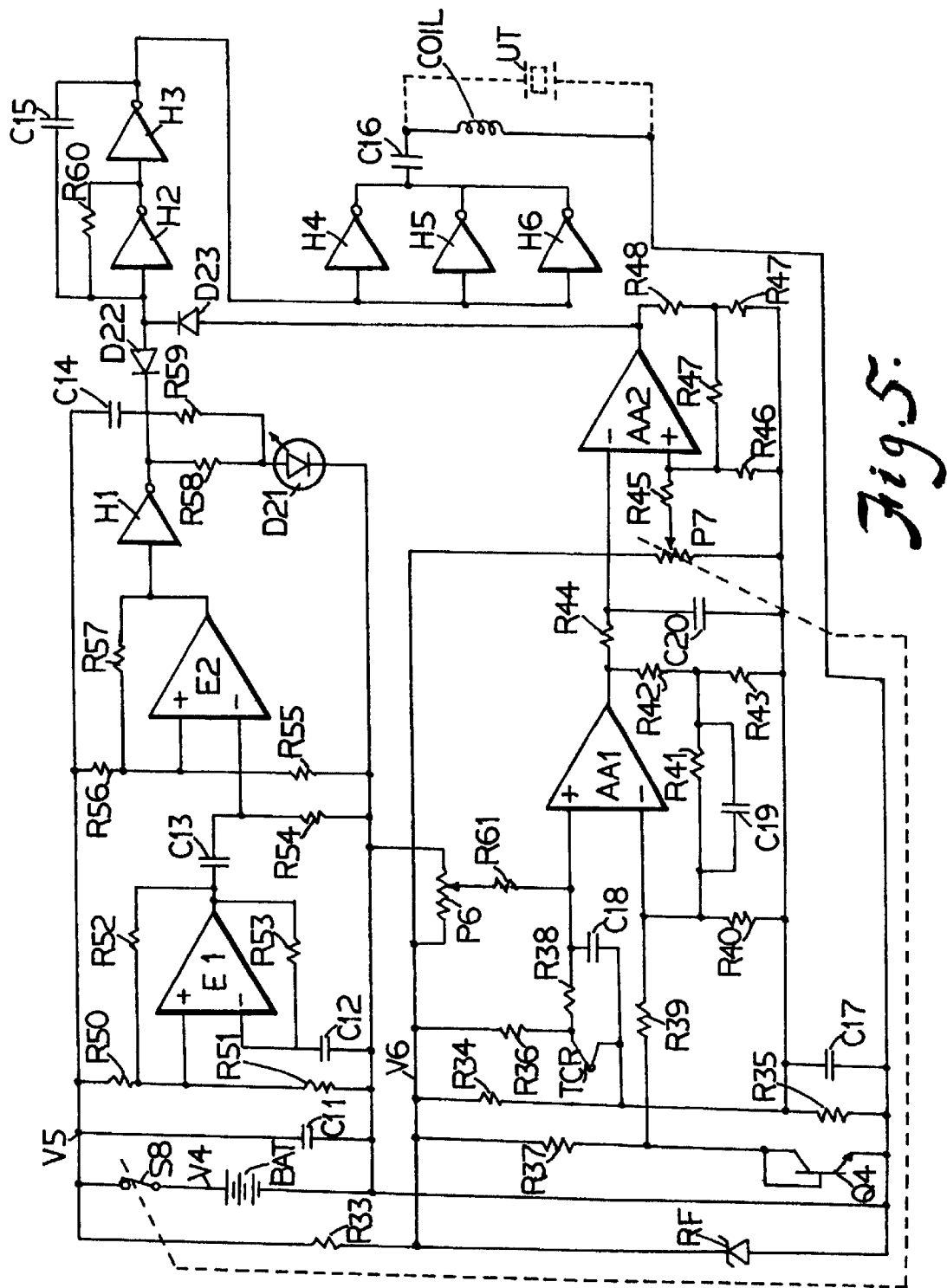
FIG. 5 is a schematic diagram of an alternate electrical circuit of the control according to the present invention using a battery operated remote sensing and control transmitter.

An electrical control circuit for use with thermocouple sensors mounted to the heat transfer plate is best shown in FIG. 4 in which L1 and L2 are incoming AC line voltages to which most electric ranges are commonly connected. The primary PR of a stepdown transformer TX is connected to the power lines L1 and L2. The low voltage secondary SR of the transformer TX is connected to diodes D1 and D2 for rectification of the AC voltage so as to produce a DC positive voltage V1 which is modulated by a capacitor C7. The center tap CT of the secondary of the transformer TX is connected to the negative pin of the capacitor which, in turn, is connected to a common negative voltage ground line G. The positive voltage V1 is applied to the input of a regulator REG which has one pin grounded and has a regulated output voltage V2. The regulated output V2 which powers most of the circuit is switched to the circuit when the potentiometer P2 is turned on for setting a required temperature of the utensil located on the burner element, by the switch S1 which is a part of a potentiometer P2. A capacitor C1 is provided to reduce the possibility of spurious oscillation of the integrated circuits present in the circuit. As soon as the potentiometer P2 is turned on, the light emitting diodes D3 and D4 will be turned on by the resistors R20 and R21 to emit a light of mixed color from this diode assembly which has two diodes, D3 and D4 each emitting a different color. The integrated circuits A1, A2, B1 and B2 have their positive voltage terminal connected to a regulated output line V2 and their negative voltage terminal connected to the ground line G. The resistors R2 and R3 and the capacitor C2 produce a divided voltage V3 which is arranged to be substantially equal to the voltage across the collector and emitter of the transistor Q1. A thermocouple TC1 is provided for sensing the temperature of the heat transfer plate PT which is substantially identical to the temperature of the utensil placed on the heat transfer plate. When the hot junction of the thermocouple TC1 is heated up with respect to the cold junction CON1 and CON2, there is a voltage generated at the cold junction. The amount of voltage generated is proportional to the temperature difference between the hot and cold junctions. The negative wire of the thermocouple is connected to the divided voltage V3 and the positive voltage of the thermocouple is applied to the non-inverting input NIV of an operational amplifier A1 via the resistor R5. A capacitor C5 is connected between NIV and V3 while the feedback capacitor C3 attenuates unwanted pick-up voltage at the output of the amplifier. To compensate for the variation in temperature of the cold junction, the transistor Q1 with its base and collector are joined together to output line V2. The base and collector volt is applied to the inverting voltage IV of the amplifier A1 by the resistor R11; and by selecting appropriate value for the resistor R11, the effect of the variation of the cold junction temperature can be greatly reduced. The resistor R4 is connected between CON1 and V2 so that if there is an open circuit in the thermocouple, the NIV voltage of A1 will go high, resulting in a high voltage at the output of integrated circuit A1, thus switching off the relay RL1 and resulting in the removal of the power to the burner element EL1. The resistors R7 and R6 and the potentiometer are used to adjust the output of the operational amplifier so that its output is zero when the temperature of the thermocouple is at zero. The resistors R9 and R8 and the potentiometer P4 sets the gain of the amplifier. Resistor R12 and the capacitor C8 roll off the frequency response of the circuit and further reduce the value of pick-up voltage; and the output of the integrated circuit A1 is applied to the IV input of the amplifier which serves as a comparator. Resistor R13 provides a voltage drop across the control potentiometer P2 so that the maximum required temperature which is set as voltage on potentiometer P2 does not exceed the selected safe level. Resistors R14, R15, R16 and R17 provide a positive feedback to allow a small hysteresis in the operation of this comparator. If the selected voltage of slider of the potentiometer representing the required temperature, which is applied to the non-inverting input NIV of the comparator, is higher than the voltage of the output of amplifier representing the utensil temperature, the output of the comparator is high. In this condition, the transistor Q2 is turned on by the resistor R18, while the resistor R19 acts as a shunt. When the transistor Q2 turns on, it applies an operating voltage to the coil of the relay RL1 to energize it, and the contact RS1 of relay RL1 will become closed so that power is applied to the element EL1 for heating up the heat transfer plate and the utensil placed thereon. When the transistor Q2 is on, it shorts out the diode D4 to draw current away from it, which changes the color output of the light emitting diode assembly. The diode D6 ensures that the diode D4 is properly turned off. Diode D8 is across the relay to limit the back EMF generated by the coil of the relay RL1 in order to protect the transistor from breaking down. If for any reason the temperature of the heat transfer plate rises too high, the thermostat TS1 will become opened, thus terminating the current to the coil of the relay and, in turn, the switch RS1 becomes opened so that power is removed from the burner element EL1. If the temperature of the utensil is higher than the required temperature set by the potentiometer P2, the output of the integrated circuit A2 is low, and it will turn off the transistor so that the relay is de-energized and the power to the burner element is again removed. The output of the amplifier is connected to the capacitor C4, while the other end of which is connected to the NIV input of the amplifier B1 and also to the resistor R24. In this arrangement the voltage at the NIV input terminal of the amplifier is proportional to the rate of rise of temperature of the heat transfer plate. The gain of this amplifier is set by the resistors R26 and R25. R23, R22 and the potentiometer P3 which is adjusted to substantially zero for the output of the amplifier when there rate of rise of temperature is substantially zero. This circuit functions to switch off the burner element EL1 in the absence of the utensil on the heat transfer plate. When there is no utensil on the plate, the rate of rise of temperature of the plate is high, this results in a high voltage level at the output of amplifier B1, and this voltage is applied to the NIV input terminal of the amplifier B2 which serves as a comparator. The resistor R29 and potentiometer P5 are used to set the rate of rise of temperature to detect the absence of a utensil and this voltage is applied to input terminal IV of the amplifier B2. If the rate of rise of the temperature of the plate is higher than the set level, it makes the output of amplifier high which turns on the transistor Q3 via the resistor R30, and the resistor R31 acts as a shunt. When the transistor Q3 is turned on, it places a short circuit on the base emitter junction of the transistor Q2, thus de-energizing the relay and removing the power from the burner element EL1. The capacitor C6 and resistor R28 is selected to have a sufficient time constant so that the plate can cool down adequately until the next attempt to switch it on A battery-operated remote-controlled circuit for the device of the present invention is best shown in FIG. 5 in which the power supply voltage is provided by batteries BAT. The battery voltage V4 is applied to the circuit by operating a control switch S8. The required temperature of the utensil is set by adjusting the potentiometer P7, and the switch S8 forms a part of the potentiometer P7. When the switch S8 is closed, it applies the supply voltage to the power line V5, which will activate the light emitting diode D21 to turn on briefly via the capacitor C14 and resistor R59. The regulated voltage for the circuit is provided by the reference diode RF and the resistor R33. The control unit operates with the heat sensing thermocouple TCR. The operation of the circuit for this unit is similar to that described in FIG. 4. Resistors R37, R39 and transistor Q4 provide the cold junction compensation circuit. Resistors R34, R35 and capacitor C17 provide the voltage divider whose voltage is substantially equal to the voltage across Q4. C11 is the smoothing capacitor. Resistors R36, R38 and capacitors C18 and C19 provide the attenuation of spurious signals and open circuit detection for the thermocouple TCR. R61 and P6 provide the zeroing circuit for the amplifier AA1, while resistors R40, R41, R42 and R43 set the gain for the amplifier. Resistor R44 and capacitor provides a further attenuation for unwanted signals. The required temperature is set on the potentiometer P7, and the set operating voltage is applied to the positive or NIV input terminal of the comparator AA2 via the resistor R45. This voltage is compared with the output of AA1 which represents the temperature of the utensil which is applied to the negative or inverting input terminal of the comparator AA2. R48, R49, R47, R46 act as voltage selection means for the positive feedback for the comparator AA2. When the utensil temperature is higher than the required set temperature, the output of the comparator is low. The output of the comparator is inverted by the inverter H6. H1–H6 are CMOS inverters. When the comparator is low, the output of the inverter H6 is high and it back biases a diode D23 to activate an oscillator composed of inverters H1 and H2 and resistor R60 and capacitor C15. During the sample time of inverter H1, the diode D22 is also back biased. An amplifier E1 is used to provide an oscillator having a relatively long operating time period. The resistors R50, R51 and R52 provide a positive feedback and the resistor R53 and capacitor C12 provide a negative feedback to produce the required oscillation. Each time the output of amplifier E1 goes from negative to positive the amplifier E2 emits a negative pulse at is output. The period of this pulse depends upon the time constant of the capacitor C13 and resistor R54 and is chosen to be small to conserve power, as its period determines the length of time of the transmission. The resistors R57, R56 and R55 provide a positive feedback so that the edges of the pulse are rapid in transition. The negative pulse is inverted by the inverter H1. If the duration the pulse is high at the output of the inverter H1, the light emitting diode D21 is turned on via the resistor R58 for indicating that the unit is in operation. When there is a positive pulse at the output of the inverter H1, the diode D23 is back biassed, and the oscillator composed of inverters H1 and H2 plus other associated components can oscillate. This oscillation is amplified by the inverters H4 and H5 and applied to the induction coil COIL2 or ultra-sonic piezo-electric transducer UT for transmission.

Figure 6:
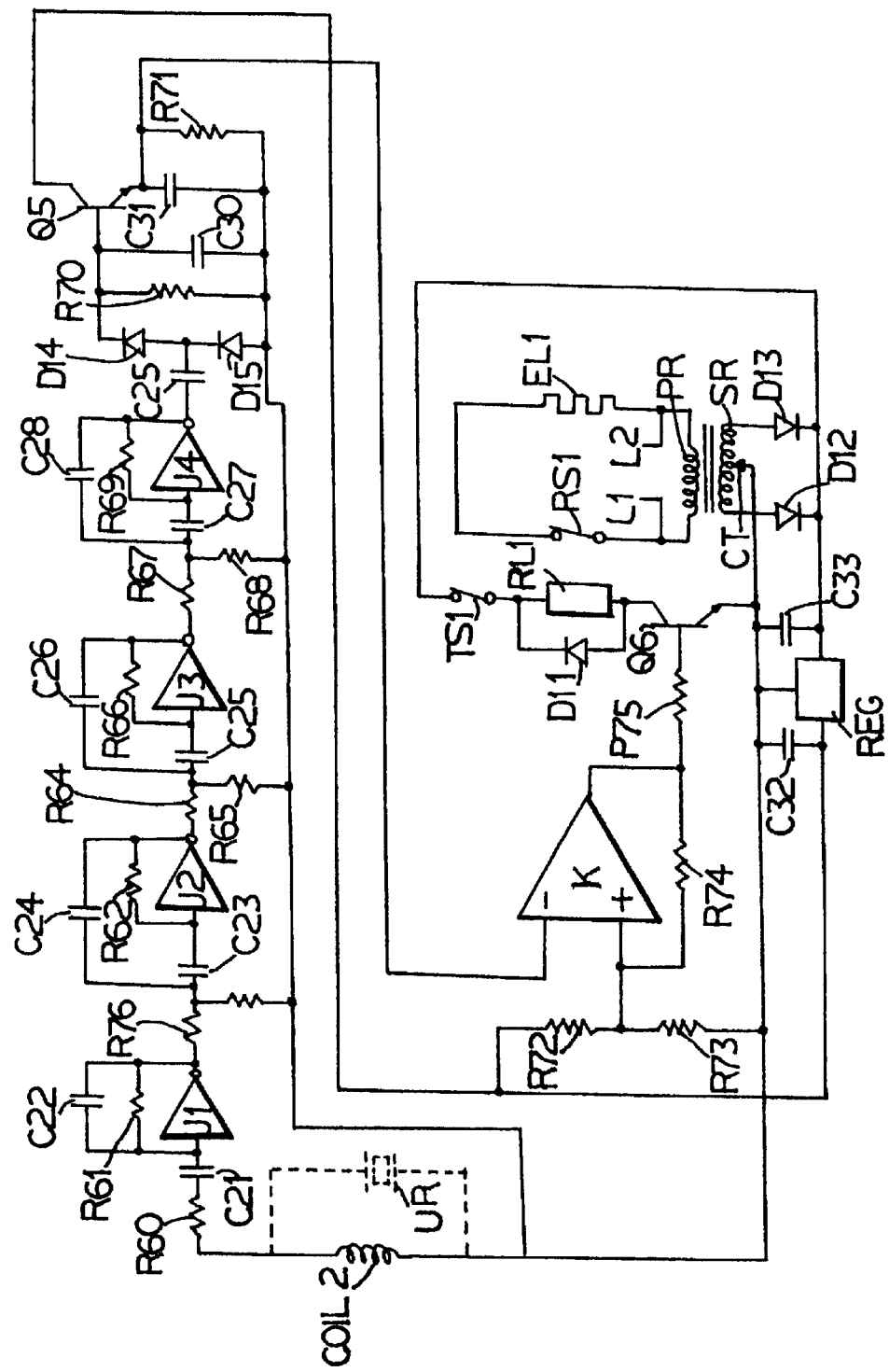
FIG. 6 is a schematic diagram of the electrical circuit of the receiver when the remote sensing transmitter is used.

A receiver unit for operating with the remote-controlled unit of FIG. 5 is best shown in FIG. 6. A regular control signal is received by the receiver to turn off a particular burner element as long as the temperature of the utensil is higher than the required set temperature. In the absence of the control signal, the burner element is turned on. The control signal is received by the coil COIL2 or the ultra-sonic piezo-electric transducer VR. This control signal is amplified by a CMOS inverter J1, where R60 and C21 are the coupling components and R61 and C22 are the feedback components. The following stages of amplification are of the type commonly termed Sallen-Key filter amplifiers. Three stages are shown in the FIG. 6; however, more stages may be added for greater filtering. In the first stage resistors R76 ,R63 R62 and associated capacitors C24 and C23 are provided. The gain, bandwidth and the center frequency of the receiver can be set by selecting the values of these components. Sirnilarly, resistors R64, R65, R66, R67, R68, R69 and associated capacitors C24, C23, C26, C25, C28 and C27 are used as the components for the other two stages. The output voltage of the inverter J4 is applied to rectifying diodes D14 and D15 by a capacitor C29. The resultant DC voltage is smoothed by a capacitor C30, and a resistor R70 is used as a bleeder resistor. The rectified DC voltage is applied to the base of the transistor Q5, the emitter of which is connected to the capacitor C31 and the resistor R71, and the time constant of which is chosen so that if the turn off pulse does not arrive in time the capacitor is discharged and the output is a low voltage. If the pulse are received at regular time the voltage at the input terminal IV of the amplifier K is low. R74, R73 and R72 are positive feedback resistors. The output of amplifier K is coupled to the base of transistor Q6 ,and when the output of the amplifier K is low, the transistor Q6 is turned off. In such condition, the relay RL1 is de-energized, and the burner elements are turned off. When a signal is not received in time, the output of the amplifier K is high which energizes the relay RL1 so that the burner elements are turned on. D11 is the diode across the relay RL1 for breakdown protection. As described previously, the transformer provides the rectified low voltage which is smoothed by the capacitor C33. A regulator REG provides the regulated voltage for the receiver unit. A capacitor C32 is connected across the regulated voltage for stability. The transformer and the regulator may be selectively shared by all the controls or may be used individually.

Figure 9:
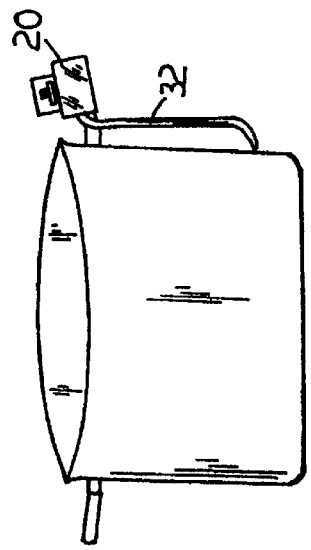
FIG. 9 is a side elevation showing the mounting of the temperature remote control unit to a cooking utensil.
Figure 8:
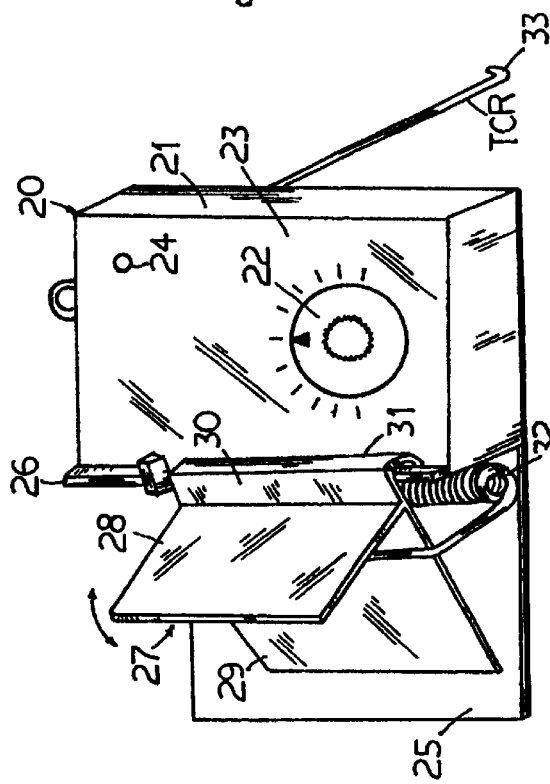
FIG. 8 is a top elevation view of the temperature remote control unit.
Figure 7:
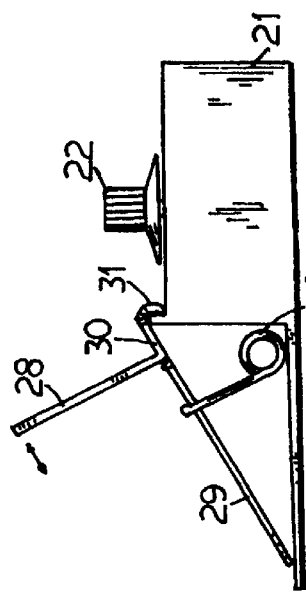
FIG. 7 is a side elevation view of the temperature remote control unit according to the present invention.

The transmitter box 20 of the remote-controlled device ofthe present invention is best shown in FIGS. 7 and 8. The transmitter box 20 has a rectangular enclosure 21. An adjustable knob 22 located at the top of the unit is mounted to the adjustable shaft of the temperature setting potentiometer in the unit. The knob 22 is operative rotatably to set the required temperature of the cooking utensil shown on a scale 23. The operation indicator of the device is provided by a light emitting diode 24. The enclosure has an extension base 25, and the top of the enclosure 21 has an upstanding ridge 26 therein adjacent to the extension base 25. A substantially T-shaped clamping member 27 is provided. The clamping member 27 has an upstanding arm 28, and the base portion perpendicular to the clamping member 27 which consists of a longer side arm 29 and a shorter side arm 30. The shorter side arm 30 has an L-shaped side edge 31. The clamping member 27 is coupled to the transmitter box 20 with the L-shaped side edge 31 engaging with the upstanding ridge 26 at the top of the enclosure 21 and the longer arm 29 extending downwards in a sloping manner down to the extension base 25. The clamping member 27 is pivotally retained in place by a torsion spring 30 such that the extension base 25 and the longer arm 29 form a clamp which is operative by pulling the upstanding arm 28 against the spring force of the torsion spring 30 for mounting the transmitter unit 20 on the handle of a cooking utensil as best shown in FIG. 9. The thermocouple 32 provided with a flexible tube extending outwards from the transmitter box 20 may be positioned with its thermal junction free end 33 contacting the side of the cooking utensil to sense its temperature. The extension base 25 and the longer arm 29 of the clamping member 27 may be curved in shaped and may include a flexible moderately high temperature material surface liner so as to provide a better grip of the handle of the utensil.

It will be appreciated by persons skilled in the art that the present invention is not limited to what has been particularly shown and described hereinabove. Rather, the scope of the present invention is defined only by the claims that follow:

What is claimed is:

1. A device for controlling the cooking temperature of a surface burner element of a cooking range having a heat control switch connected in series with said burner element for controlling energization of said burner element, comprising a heat transfer metal plate removably mounted in a fixed position on top of said burner element, said metal plate having a uniformly flat top surface and a flat under surface, said top surface being adapted to contact with the entirety of a cooking base of a utensil placed on said metal plate whereby said metal plate and said cooking base have an identical temperature, and said under surface being always in contact with said top of said burner element, a temperature sensing means mounted in contact with said under surface of said metal plate, said temperature sensing means having a predetermined opening temperature, a relay means having switching contacts connected in series with said burner element and said heat control switch, and said relay means being connected in series with said temperature sensing means and adapted to open said switching contacts to de-energize said burner element when said temperature sensing means detects a temperature at said metal plate higher than said predetermined opening temperature of said temperature sensing means.

2. A device according to claim 1 wherein said temperature sensing means is a thermostat having a heat sensing surface abutting said under surface of said metal plate.

3. A device according to claim 2 wherein said relay means has a low voltage operating coil operated with a direct current input voltage.

4. A device according to claim 3 including a transformer means having a low input voltage secondary connected to said low voltage operating coil of said relay means and said thermostat.

5. A device according to claim 4 including a rectifier means connected to the secondary of said transformer means and said low voltage operating coil of said relay means, and being operative to energize said low voltage operating coil of said relay means to close said relay contacts when temperature of said metal plate is lower than said predetermined opening temperature of said thermostat.

6. A device for controlling the cooking temperature of a surface burner element of a cooking range having a heat control switch connected in series with said burner element for controlling energization of said burner element, comprising a heat transfer metal plate removably mounted on top of said burner element, said metal plate having a uniform flat top surface and a flat under surface, said top surface being adapted to contact with the entirety of a bottom cooking base of a cooking utensil placed on said heat transfer metal plate whereby said heat transfer metal plate and said cooking base always have an identical temperature, and said under surface being in constant contact with said top of said burner element, a thermocouple having a temperature sensing means mounted in contact with said under surface of said heat transfer metal plate, a switching circuit means connected to said thermocouple, said switching circuit means operative to become open circuit when said temperature sensing means detecting temperature of said heat transfer metal plate rising above a predetermined temperature, a relay means having electrical switching contacts connected in series with said burner element and said heat control switch, and having a low voltage energization coil connected in series with said switching circuit means, a transformer means having a low voltage secondary output connected to said low voltage energization coil of said relay means and said switching circuit means, and being operative to energize said low voltage energization coil of said relay means to close said electrical switching contacts when temperature of said heat transfer metal plate is less than said predetermined temperature.

7. A device according to claim 6 wherein said temperature sensing means is a heat sensing junction mounted to a washer member, and said washer member is mounted to said metal plate with said heat sensing junction abutting said metal plate.

8. A device for controlling the cooking temperature of a surface burner element of a cooking range having a heat control switch connected in series with said burner element for controlling energization of said burner element, comprising a heat transfer metal plate fixedly mounted on top of said burner element, said metal plate having a uniform flat top surface and a flat under surface, said top surface being adapted to contact with the entirety of a cooking base of a cooking utensil placed on said metal plate whereby said metal plate and said cooking base have an identical temperature, and said under surface being in constant contact with said top of said burner element, a temperature sensing means operative to be mounted on said cooking utensil, said temperature sensing means including a thermocouple junction adapted to contact a side surface of said cooking utensil and operative to provide an electrical signal representative of temperature of said metal plate, and an electronic transmission means operative by said electrical signal to emit a transmission signal representative of said temperature of said metal plate, an electronic receiver means mounted on said cooking range, said electronic receiver means including a relay means having switching contacts connected in series with said burner element and said heat control switch, and having a low voltage actuation coil connected to a switching means operative by said transmission signal, a transformer means having a low voltage secondary connected to said low voltage actuation coil of said relay means and adapted to energize said relay means to open said switching contact when said temperature sensing means detecting a temperature at said metal plate higher than a predetermined temperature.

9. A device according to claim 8 including a fail-safe means in said electronic receiver means operative to de-energize said burner element to prevent a runaway condition to occur in said burner element in absence of a cooking utensil placed on said metal plate.

* * * * *